Patented Aug. 2, 1949

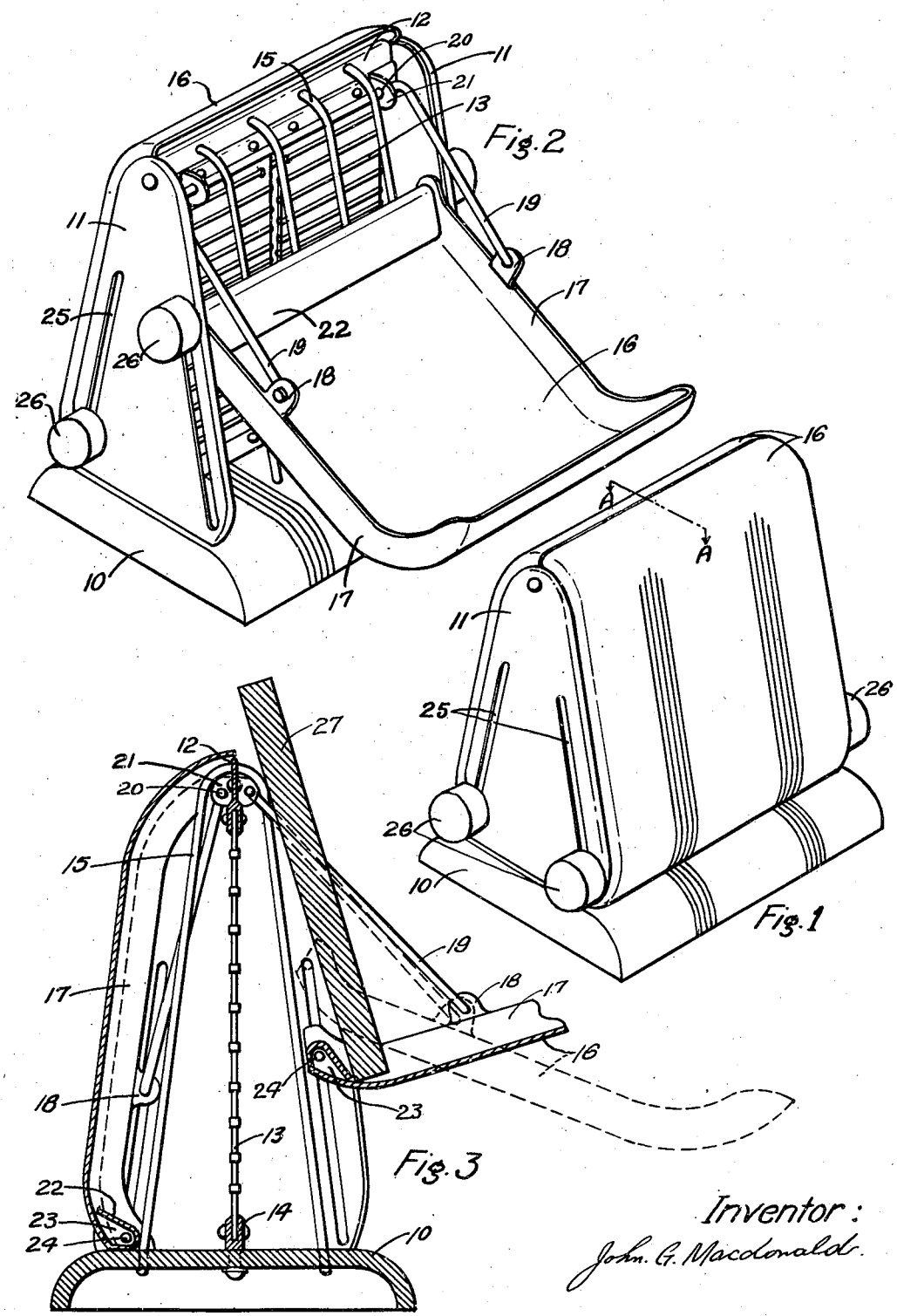

2,477,814

UNITED STATES PATENT OFFICE 2,477,814

TOASTER

John G. Macdonald, London, Ontario, Canada

Application September 4, 1945, Serial No. 614,186

5 Claims. (Cl. 99—395)

My invention relates to bread toasters and particularly to a new and improved electrically-heated toaster of the class known in the art as "turn-over" toasters.

The turn-over type toasters generally comprise a framework consisting essentially of a base and end pieces supporting a vertically-mounted heating element flanked on either side by bread slice receiving trays hinged or pivoted in such a manner that manual operation of said trays through their normal arc of movement, away from and then back toward the heating element, serves to automatically reverse the bread slices and present the untoasted sides to the element.

In toasters of this general type heretofore produced the turn-over action normally commences with the initial movement of the bread trays away from the toasting position adjacent the element and thus prohibits partial opening of the trays for visual inspection of the degree of toasting without necessarily completing the reversal of the bread slice.

A further disadvantage of such toasters is the large table area required to provide the clearances necessary for operation of the bread trays and the excessive overall height required to pivotally mount the bread trays in such a manner that the automatic turn-over action is assured.

A still further disadvantage of such toasters is the difficulty of cleaning the base and adjacent parts of the toaster due to the fixed pivot mounting arrangement of the bread trays.

It is a principal object of my invention to alleviate the aforesaid disadvantages by the provision of a turn-over type toaster of simple construction which has a simple and novel bread tray operating arrangement that may be manually utilized not only to reverse the surface of the bread slice presented to the heating element, but also, by movement to an intermediate position, to place the bread slice in a position where the degree of toasting may be visually inspected and the bread slice then either reversed or returned to the element for further toasting without reversing, as desired.

Another object of my invention is to provide a turn-over toaster which does not require the excessive area of table space or the height heretofore necessary for such devices and which may be readily cleaned without the actual removal of parts therefrom.

It is a further object of my invention to provide a toaster of simple construction which may be easily manufactured in large quantities and at low cost and which has a minimum number of parts.

Still further objects and advantages of my invention will become apparent from the following description referring to the accompanying drawings, and the features of novelty which characterize my invention will be pointed out with particularity in the claims annexed to and forming a part of this specification.

In the drawings,

Fig. 1 is a perspective view of a preferred embodiment of my toaster illustrated with both of the bread trays in their closed, or toasting, position;

Fig. 2 is another perspective view of the toaster shown in Fig. 1 but with one of the bread trays illustrated in the fully open position;

Fig. 3 is a vertical sectional view taken along the line A—A of Fig. 1, with one of the bread trays illustrated in the partially open position utilized for visual inspection of the bread (the fully open position of the same tray being shown in broken lines in this view).

Referring now in detail to the drawings, in which like reference characters refer to like parts throughout the several views, 10 indicates generally the toaster base, supporting vertically mounted end walls 11. The said end walls 11 are assembled to the base 10 by well-known means such as fold-over lugs (not shown) and the upper portions of said end walls are held in spaced-apart relationship by a horizontally mounted crosspiece 12. Crosspiece 12 also serves to support the upper ends of vertically mounted heating element 13, the lower ends of said element being supported as at 14 on base 10. Element-guard wires 15 extend through openings provided at spaced apart intervals in the horizontal crosspiece 12 and in the base 10.

A bread tray 16 is movably supported at each side of the heating element 13 and at the outer side of the respective guard wires 15 by links 19 one at each side edge thereof, with the links pivotally suspended from openings 20 in ears 21 projecting from the respective side of the frame cross-piece 12. The lower ends of the links 19 pivotally engage ears 18 projecting from the free edges of the side flanges 17 of the tray inwardly from the tray in the plane of its movement. The ears 18 are disposed a distance above the lower end of the associated tray, such distance being preferably less than half the vertical length of the tray, for the purpose hereinafter described. The links 19 for each tray preferably form the legs of a U-shaped member of the loop of which is mounted in the apertures of the ears 21.

The bottom edge of each tray 16 has an extension that is reversely bent at the inner side of the tray to form an inclined bread slice supporting shelf 22. This extension also forms a space 23 within the lower edge portion of the tray through which a pivot wire 24 may be projected with its ends extended through registering apertures in the tray flanges 17 and into vertically elongated slots 25 in the adjacent edge portions of the end walls 11. The slots 25, which, in the present instance. are parallel to the guard wires 15, extend from near the base 10 to points above the permissible arcs of movement of the tray connecting ends of the links 19. A knob 26 is mounted on each end of each pivot wire 24 to facilitate manual raising and lowering of a wire with the associated slots.

The lower end of each tray and its side flanges 17 are preferably curved inwardly to a slight extent and the flange apertures for receiving the wire 24 disposed in line with the straight edge portions of the flanges, as indicated in Fig. 3. It is apparent that upon a raising of the lower end of a tray 16 when in closed or toasting position, the wire 24 will be guided upward by the slots 25 and at the same time the upper end of the tray will swing outwardly due to the swinging support afforded by the links 19. Such movement may be sufficient to cause the tray to assume an inspection position, as indicated in Fig. 3, with the tray inclined upwardly and inwardly to some extent from a horizontal, or to assume a toast-reversing position, as indicated in Fig. 2, with the tray inclined downwardly and outwardly from a horizontal. The shape of the shelf 22 is such that a slice of bread supported thereby is caused, in either of said positions, to slide outwardly and downwardly to the bottom of the tray to facilitate reversal of the bread, as is apparent.

The upper ends of the trays 16 are curved inwardly substantially a quarter turn or to an extent necessary to cause such ends to lap over the cross-piece 12 and upper ends of the guard wires 15 to meet in a center line over said cross-piece and cooperate with the side walls 11 to close the top of the toaster. This gives the toaster a pleasing and finished appearance with the trays fitting within both the top and side edges of the side walls.

The electrical connections for the toaster are made in the well known manner and for clarity are not illustrated herein.

In operation, the bread trays 16 are moved toward or away from the element 13 as desired by manual operation of the knobs 26, sliding the rods 24 upward or downward in the guide slots 25 provided in the end walls 11. When the knobs 26 (and the attached rods 24) are at the extreme lower limit of the slots 25 the bread trays 16 are in their fully closed or "toasting" positions as indicated in Fig. 1. Movement of the knobs to the extreme upper limits of the slots 25 moves the bread trays to the fully open position (as indicated by one of said trays in Fig. 2). Since the trays are mounted individually, they may be operated separately as well as together and since knobs 26 are provided at each end of each tray the said trays may be operated from either end of the toaster.

Movement of the knobs 26 to a position slightly more than half way from the lower limits of the slots 25 serves to lift the bread trays into the partially opened position, illustrated for one of said trays in Fig. 3, and in this position the bread slice (indicated by reference character 27) is in the visual inspection position. When in this position a considerable portion of the bread slice 27 is above the top of the element and the side of the slice that has been adjacent the element 13 may be visually examined to determine the degree of toasting and decide whether the same side should be returned to the element for further toasting or whether the slice should be reversed. This raising of the upper end of the bread slice above the top of the toaster also enables the slice to be grasped and removed or tipped outwardly for better inspection without danger of touching hot portions of the toaster. If, after inspection, it is decided to return the same side of the slice for further toasting, it is merely necessary to return knob 26 to the lower extremity of slot 25 without the necessity (as in the case of turn-over type toasters heretofore produced) of completing the operation of moving the bread tray to its fully opened position to complete the turn-over of the bread, returning it then to toasting position and then repeating the entire cycle to again place the bread slice in its original position for completing the toasting of the side first presented to the heating element. However, if it is decided to reverse the toast after visual inspection in accordance with my invention, further movement of the knob 26 upward in the slot 25 commences the turn-over action which is completed when the knob reaches the upward extent of the slot and the bread slice tray is in its fully open position. Returning the knob 26 to the bottom extremity of the slot 25 then serves to move the bread tray back into toasting position adjacent the element but with the bread slice reversed.

It will be noted that in accordance with my invention, when the bread trays are moved to the "inspection" position they are raised completely clear of the base 10 and cleaning of the top surface of said base and of other adjacent parts of the toaster is thus facilitated. It will also be apparent that the action of raising the pivot point of the bread tray in the manner illustrated and described herein minimizes the table area required for the opening and closing of said trays and my toaster therefore requires considerable less table space than turn-over toasters having trays pivoted at a fixed point adjacent the base in the conventional manner. It will also be apparent that the arrangement of my invention may be utilized to provide a turn-over toaster of less overall height due to the fact that the bread trays may be mounted considerably lower than was heretofore possible with the bread tray pivot points in a fixed location. By the novel action provided in my toaster the tray pivots are, during the initial movement of the operating knobs, raised from an extremely low position adjacent the base to a sufficient height to allow use of the turn-over action and when the turn-over action is completed the trays are again returned to their original position.

While there has been shown and described herein a particular embodiment of my invention, it will be obvious to those skilled in the art that various changes and modifications can be made without departing from the invention and, therefore, it is aimed in the appended claims to cover all such changes and modifications as fall within the true spirit and scope of my invention.

What I claim as new and desire to secure by Letters Patent of the United States is:

1. Manual operating means for a turn-over type electric toaster, said operating means including a pair of bread slice trays pivotally connected to the framework of said toaster by U-shaped supports, the base of said supports mounted adjacent the top of said toaster and the ends of said supports fastened to opposite sides of said trays; operating knobs fastened adjacent the bottoms of said trays by rigid rods or the like passing through vertical slots in the end walls of said toaster.

2. In an electric toaster, a frame housing an electric heating element and having side walls with an opening therebetween at one side of the element, a bread slice tray movably closing said opening, means forming a pivotal connection between the lower end of the tray and said walls permitting vertical swinging movements of the tray to different positions, said connection being shiftable relative to the frame to raise and lower one relative to the other, and means swingingly suspending the tray from the top portion of the frame and attaching to the tray intermediate its ends whereby the lower end of the tray moves upward as the tray swings outward and downward from closed position, and vice versa.

3. In an electric toaster, a frame housing an electric heating element and having side walls with an opening therebetween at least at one side of the element, a bread slice tray for closing said opening, mounting means for the tray comprising means swingingly suspended from the top portion of the frame and pivotally attached to the side edges of the tray, a distance above its lower end, and means connecting the lower end of the tray to said side walls and guiding said lower tray end for raising and lowering movements when the tray is swung outwardly or inwardly, respectively.

4. An arrangement as called for in claim 3 wherein said connecting means has provision for manual engagement to impart the guided movements thereto.

5. In an electric toaster, a frame housing an electric heating element and having side walls with an opening therebetween at least at one side of the element, a bread slice tray for closing said opening, mounting means for the tray comprising means swingingly suspended from the top portion of the frame and pivotally attached to the side edges of the tray a distance above its lower end, and means connecting the lower end of the tray to said side walls and guiding said lower tray end for raising and lowering movements when the tray is swung outwardly or inwardly, respectively, the guide feature of said connecting means extending above the lower arc of movement of the points of pivotal connection of said suspending means with the tray whereby the tray may be swung to an outwardly and downwardly inclined position.

JOHN G. MACDONALD.

REFERENCES CITED

The following references are of record in the file of this patent:

UNITED STATES PATENTS

| Number | Name | Date |
|---|---|---|
| 1,103,218 | Odle | July 14, 1914 |
| 1,376,023 | Long et al. | Apr. 26, 1921 |
| 1,455,190 | Dodge | May 15, 1923 |
| 1,669,501 | Van Deventer | May 15, 1928 |
| 2,008,799 | Samuels | July 23, 1935 |
| 2,121,444 | Osrow | June 21, 1938 |
| 2,133,392 | Lent | Oct. 18, 1938 |
| 2,193,582 | Cullomer et al. | Mar. 12, 1940 |
| 2,362,415 | Sivley | Nov. 7, 1944 |

FOREIGN PATENTS

| Number | Country | Date |
|---|---|---|
| 12,252 | Great Britain | 1913 |